US Patent [19]  
Gruenhoff et al.

[11] Patent Number: 4,874,615  
[45] Date of Patent: Oct. 17, 1989

[54] PROCESS FOR PREPARING WINE

[75] Inventors: Ulrich Gruenhoff; Bernhard Schneider, both of Bad Hoenningen, Fed. Rep. of Germany

[73] Assignee: Kohlensaeurewerk Deutschland GmbH, Bad Hoenningen, Fed. Rep. of Germany

[21] Appl. No.: 168,442

[22] Filed: Mar. 15, 1988

[30] Foreign Application Priority Data

Mar. 16, 1987 [DE] Fed. Rep. of Germany ....... 3708465

[51] Int. Cl.$^4$ ............................................. C12G 1/02
[52] U.S. Cl. .................................... 426/15; 426/474; 426/477; 426/592; 426/489
[58] Field of Search ................... 426/7, 11, 15, 16, 29, 426/592, 62, 474, 477, 489

[56] References Cited

U.S. PATENT DOCUMENTS 3,741,770  6/1973  Van Olphen ........................ 426/15
4,132,161  1/1979  Helwig ................................. 99/472
4,238,511  12/1980  Egretier ............................. 426/15

Primary Examiner—Marianne Cintins
Attorney, Agent, or Firm—Foley & Lardner, Schwartz, Jeffery, Schwaab, Mack, Blumenthal & Evans

[57] ABSTRACT

A process for preparing wine of improved quality is described, in which the preparation of the grape mash is carried out under the action of carbon dioxide.

10 Claims, No Drawings

PROCESS FOR PREPARING WINE

BACKGROUND OF THE INVENTION

The present invention relates to a process for preparing wine.

In conventional processes the grapes after picking are first converted into a mash. The converting step comprises separating the stalks from the berries in a stemmer and additionally crushing the resulting grape material into a mash which is then stored temporarily in a storage tank.

After a waiting period, must is then obtained by collecting initial must and/or by pressing the mash. The combined must streams are then subjected to further treatment stages, for example, clarification, natural and/or induced fermentation, etc. In conventional processes the quality of the wine is mainly determined by the way in which fermentation is conducted.

West German Pat. No. 2,632,045 discloses a process for breaking down grapes by explosion crushing with compressed air followed immediately by separation of the must by centifuging. There remains a need, however, for improved wine-producing processes which can produce better yields of high quality wine.

SUMMARY OF THE INVENTION

Surprisingly, it has been found according to the present invention that by a simple additional measure in the preparation of the mash, the quality of the wine which later results can be influenced considerably. This measure comprises carrying out the step of converting the grape material into a mash under the action of carbon dioxide.

The invention therefore comprises a process of preparing wine comprising the steps of converting grape material into a mash under the action of carbon dioxide, collecting initially formed must from the mash, and fermenting the must.

DETAILED DESCRIPTION OF THE PREFERRED EMBODIMENTS

The necessary carbon dioxide may be added to the grape material prior to inducing it into the crushing assembly, or it may be introduced directly into the crushing assembly. The carbon dioxide may be used in gaseous or in solid form, e.g. as dry ice or as carbon dioxide pellets. It is possible to recycle carbon dioxide obtained from the fermentation. However, the use of solid or pressure-relieved, refrigerated carbon dioxide is preferred, since this causes a cooling of the grapes which provides for particularly gentle further treatment. The temperature of the resulting grape mash is then in the range of approximately 0° C. to 15° C.

In a further variant of the invention the resulting grape mash is transferred from the crushing assembly into a storage tank under the action of carbon dioxide. Additional carbon dioxide may be added if needed.

Converting the grape material into a mash may be done in a known way by crushing the grapes by conventional means. In a particular variant of the process use is made of the known process of explosion crushing. For this, according to the invention, the grape material, to which optionally carbon dioxide, preferably gaseous carbon dioxide, may already have been added, is fed into a pressure chamber. After closing the pressure chamber, the material is treated with carbon dioxide, preferably at pressures in the range of 1.1 to 10 bar, and then is expanded explosively through an expansion value into an expansion chamber. The resulting grape mash is then transferred into the storage tank as described above. This may be done using conventional delivery devices such as e.g. a pump.

For the production of white wine, according to a variant of the invention the grape mash, after transfer into the storage tank, is prescreened and pressed. Hereby it is seen that surprisingly in the process according to the invention, significantly higher proportions of must can be drawn off as initial must. This leads to an increase in capacity and increase in quality or reduction in costs in the screening stage.

The obtained must is then fermented in the usual way. According to the invention, fermentation comprises natural and/or induced fermentation. Within the context of the present invention natural fermentation denotes the action of enzymes which are inherently present in the mash, while induced fermentation denotes the action of added enzymes (yeasts).

White wine obtained according to the invention is distinguished from a wine obtained in accordance with the prior art by particular advantages e.g. higher total alcohol content, higher sugar-free extract, lower biological susceptibility.

In another preferred variant, for obtaining red wine, the grape must is fermented directly on the mash, preferably by natural fermentation, and then pressed off. The juice or wine thus obtained can be subjected to another subsequent fermentation, if desired. In conventional mash fermentation processes the grape mash is usually fermented for approximately 8 days. Contrary thereto according to the invention only up to 4 days are needed, preferably 2 to 4 days. In conventional mash fermentation processes such short periods of time can only be achieved by the additional use of pressure and/or temperature. Such additional measures are not needed in the process according to the invention, but certainly may also be used, if desired.

The fermentation in the process according to the invention takes place altogether more quietly, and surprisingly, it produces a high-quality wine which is distinguished e.g. by a higher alcohol content and higher extract contents, particularly higher sugar-free extract contents, by which among other things the bouquet of the wine is advantageously influenced.

A particular advantage of the process according to the invention is that it enables red wines with a very good depth of color to be obtained. Thus by means of the process according to the present invention it is possible to obtain a wine with distinct advantages of color and taste and a low tannin content from grapes with a low depth of color and a high proportion of tannin. This wine too is distinguished by a low biological susceptibility.

As mentioned above, there is a known process for breaking down grapes by means of explosion crushing and immediately separating off the must by centrifuging. However, compressed air in particular is used therein as a pressure providing gas, and it was not forseeable that by using carbon dioxide in the step of crushing and converting the grapes into a mash the surprising advantages described above for the fermented wine could be achieved.

The following examples further illustrate the invention without limiting its scope.

Example 1: Preparation of a white wine

Grapes of the vine variety Optima were explosion-crushed in a single-stage pressure expansion device (Manufacturer Firma KWD, Bad Hoenningen) with gaseous carbon dioxide at a pressure of approximately 3 bar and transferred directly into an intermediate tank. Initial must was first drawn off from this tank. The initial must yield was 9.8% higher than in a parallel test with conventional grape crushing. After a standing time of 24 hours the remaining must was pressed off, and the combined must streams were fermented for 9 days at room temperature. The resulting wine had a rich bouquet and showed the following analysis data:

Total alcohol content: 80.7 g/l
Sugar-free extract content: 22.0 g/l

A wine obtained from a mash which was prepared in a known manner by conventional grape crushing but was otherwise treated identically, showed the following results with a lesser bouquet:

Total alcohol content: 75.6 g/l
Sugar-free extract content: 21.6 g/l.

Example 2: Preparation of a red wine

Grapes of the vine variety Portugieser were treated as in Example 1. Working at an ambient temperature of 20° C. the grape mash which was produced had a temperature of approximately 14° C. as it left the pressure expansion device and was transferred into a tank under carbon dioxide gas. The mash was subjected to natural fermentation in the tank at room temperature for 3.5 days and then the wine produced was separated off. In comparison with a conventionally produced wine naturally fermented for 8 days, the wine according to this example was distinguished by a considerably improved depth of color and the lack of any taste of bitter almonds. The analysis gave the following picture:

| Wine of Example 2 | Alcohol g/l | Sugar-free extract g/l |
|---|---|---|
| According to the invention | 66.3 | 27.2 |
| Comparison | 58.5 | 25.9 |

Example 3: Preparation of red wine

Spatburgunder grapes were processed analogous to Example 2. The wine, which likewise was a very deep color, gave the following analysis values:

| Wines of Example 3 | Alcohol g/l | Residual Sugar g/l | Sugar Free Extract g/l |
|---|---|---|---|
| According to the invention | 78.5 | 4.5 | 28.9 |
| Comparison | 75.2 | 1.5 | 25.1 |

Subsequent additional fermentation made it possible to further reduce the proportion of residual sugar, thereby increasing the alcohol yield, with the quality of the wine remaining unchangedly high otherwise.

The foregoing description and examples have been set forth merely to illustrate the invention and are not intended to be limiting. Since modifications of the described embodiments incorporating the spirit and substance of the invention may occur to persons skilled in the art, the scope of the invention is to be limited solely with respect to the appended claims and equivalents.

What is claimed is:

1. A process of preparing wine comprising the steps of adding carbon dioxide to grape material and converting the grape material into a mash comprising crushed grape material in the presence of the added carbon dioxide, collecting initially formed must from the mash, and fermenting the must.

2. A process according to claim 1, wherein said wine is a red wine.

3. A process according to claim 1, wherein the initially formed must is collected from the mash by pressing off the must from the mash.

4. A process according to claim 1, wherein said converting step comprises subjecting grapes to pressure by means of carbon dioxide gas and subsequent explosive expansion through an expansion valve.

5. A process according to claim 1, wherein the grape mash resulting from the converting step is transferred into a storage tank in the presence of carbon dioxide.

6. A process according to claim 1, wherein for preparing white wine the grape mash is initially screened, the must is pressed off, and then the must is fermented.

7. A process according to claim 1, wherein for preparing red wine the grape must is fermented directly in contact with the mash and subsequently pressed off.

8. A process according to claim 7, wherein the must is fermented further after pressing off.

9. A process according to claim 5, wherein the grape mash is fermented for up to 4 days.

10. A process according to claim 9, wherein the grape mash is fermented for from 2 to 4 days.

* * * * *